US 6,643,771 B2

United States Patent
Tsushima et al.

(10) Patent No.: US 6,643,771 B2
(45) Date of Patent: Nov. 4, 2003

(54) METHOD FOR INITIALIZING AND SHUTTING DOWN A COMPUTER SYSTEM

(75) Inventors: Yuji Tsushima, Kokubunji (JP); Keitaro Uehara, Kokubunji (JP); Atsushi Nakajima, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/207,953

(22) Filed: Jul. 31, 2002

(65) Prior Publication Data

US 2003/0110247 A1 Jun. 12, 2003

(30) Foreign Application Priority Data

Dec. 6, 2001 (JP) .......................................... 2001-372153

(51) Int. Cl.[7] ................................................ G06F 9/24
(52) U.S. Cl. .......................... 713/1; 713/300; 713/330; 710/15
(58) Field of Search .............................. 710/15; 713/1, 713/2, 300, 330

(56) References Cited

U.S. PATENT DOCUMENTS

| | | | | |
|---|---|---|---|---|
| 5,652,885 A | * | 7/1997 | Reed et al. ........................ | 713/1 |
| 5,832,283 A | * | 11/1998 | Chou et al. ....................... | 713/300 |
| 6,038,399 A | * | 3/2000 | Fisher et al. ..................... | 717/178 |
| 6,092,189 A | * | 7/2000 | Fisher et al. ..................... | 713/1 |
| 6,128,734 A | * | 10/2000 | Gross et al. ...................... | 713/100 |
| 6,324,644 B1 | * | 11/2001 | Rakavy et al. ................... | 713/1 |
| 6,421,775 B1 | * | 7/2002 | Brock et al. ...................... | 713/1 |
| 6,480,955 B1 | * | 11/2002 | DeKoning et al. .............. | 713/100 |
| 6,564,318 B1 | * | 5/2003 | Gharda et al. ................... | 713/2 |

FOREIGN PATENT DOCUMENTS

JP    6-266627    3/1993

* cited by examiner

Primary Examiner—Jeffrey Gaffin
Assistant Examiner—Harold Kim

(57) ABSTRACT

In a computer system comprising a plurality of computers interconnected by a network, the following steps are implemented: checking the booting of the individual computers when their power is turned on, checking the available memory space and I/O volumes on the individual computers, and determining a schedule of interleaving the memory and the I/O components. Thereby, the invention provides a multiprocessor system operating with shared memory units in a multiplex manner. In a computer system comprising elemental servers (each functioning as a single server unit and has an SSP) and a network interconnecting the servers. The SSP in conjunction with a chip set provides means for communication through control packets transmitted over the network. The SSP controls the components of the elemental server including the power supply unit. By setting a schedule of interleaving the memory and the I/O components across the plurality of servers, a multiprocessor system operating with shared memory units in a multiplex manner.

19 Claims, 6 Drawing Sheets

METHOD FOR INITIALIZING AND SHUTTING DOWN A COMPUTER SYSTEM

BACKGROUND OF THE INVENTION

1. Field of the Invention

The present invention relates to a computer system in which small multiprocessors operating with shared memories are employed to constitute a large-scale multiprocessor system operating with shared memory units. The invention also relates to a method of initializing such system.

2. Description of Related Art

As the Internet becomes popular, data centers on the Internet (hereinafter "iDCs") or the like have been built such that a great number of servers are installed to provide iDC services. An iDC receives requests for processing from users over the Internet and returns the result of the processing to the users. In the iDC, a multiprocessor system operating with shared memories or a cluster system is generally used to carry out rapid processing. Such a system achieves allocating a plurality of processors to process one request and executing any relevant transactions so as to shorten the response time.

Typical multiprocessor systems with shared memories are high-end servers such as Sun Enterprise 10000 and HP Superdome (which will be referred to as "first prior art" hereinafter). These systems are configured in a form in which CPUs, memory units, and I/O subsystems are interconnected by a boardband network called a switch. To supply power to these components, redundant power supply units are generally used. The above systems are initialized by the following mechanism: when one of the systems boots, its power supply units are turned on to automatically begin power supply to the whole system and perform its initialization. In the first prior art, all CPUs share the memory units and I/O subsystems such that a plurality of processors can easily execute a transaction requested by a user in a parallel-processing mode.

For the high-end servers having a great number of CPUs, generally, it is not practiced to operate the CPUs within the system under one OS. Instead, the system is divided into a plurality of sectional computer subsystems and each sectional computer subsystem runs its own OS, so that the system can also be operated as a cluster system which will be described later.

On the other hand, the cluster system (which will be referred to as "second prior art" hereinafter) is configured in a form in which computers, each of which operates as a server under an independent OS, separately powered with its own power supply unit, are interconnected by a network. Therefore, the memory units and I/O subsystems in the system are not shared across the processors constituting the cluster system. By the support of middleware or application, the cluster system allows a plurality of processors to execute a transaction requested by a user so as to shorten the response time.

In the foregoing first prior art, it is theoretically possible to combine sectional computer subsystems, each having any number of CPUs, and the resulting number of the sectional computer subsystems may be very large. However, the same number of power supply units as the number of the sectional computer subsystems cannot be prepared. Consequently, it is impossible to set up sectional computer subsystems beyond the number of the power supply units. The power supply units are redundantly provided unless they are shared across the sectional computer subsystems. As such, it becomes impossible to control power On/Off per each sectional computer subsystem. This poses a problem that even if a sectional computer subsystem is out of service with its OS shut down, its power cannot be turned off while another sectional computer subsystem is operating that shares the power supply with it (which will be referred to as "problem 1" hereinafter).

In the foregoing second prior art, because each server has its power supply unit, the above problem 1 does not arise. However, when booting (initializing) and shutting down the system, it is necessary to turn the power on and shut down the power supply at all computers in the system which burdens the power on/off management significantly. To eliminate such a burden to the power on/off management, the following method is taken. A server for managing the cluster system is set up and middleware for power on/off management is installed on the server, wherein this management is implemented via a network. However, this incurs additional middleware and cost (which will be referred to as "problem 2" hereinafter).

A further problem with the second prior art (which will be referred to as "problem 3" hereinafter) is as follows. Because the memory units and I/O subsystems are not shared across the processors, it is necessary to provide the application run on each processor with a parallel processing function or use the middleware for such a function. This implementation of parallel processing is slow and inefficient.

SUMMARY OF THE INVENTION

It is an object of the present invention to provide a computer system wherein, the computer system is divided into a plurality of sectional computer subsystems, it is possible to turn the power on for each sectional computer subsystem separately.

Another object of the invention is to reduce the management cost required for booting (initializing) and shutting down a multiprocessor system operating with shared memory units.

According to a typical implementation manner of the present invention, a computer system comprises a plurality of elemental servers and a router for interconnecting these elemental servers, each server comprising one or more CPUs, a memory, a BIOS, an I/O subsystem, and a power supply unit so as to function as a single server unit. In this computer system, each elemental server is provided with an initialization procedure in which the following are implemented. Each elemental server, at the instant of turning its power switch on, issues power-on inquiry packets to other elemental servers in order to organize and boot a multiprocessor system operating with shared memory units by checking whether the power has been turned on at each other elemental server. If the reply packets to the inquiry packets have been returned from all elemental servers of the multiprocessor system operating with shared memory units, each elemental server issues a packet for gaining a representative right in the system. The representative server that gained the representative right issues packets for checking available memory space and the I/O volumes on other elemental servers. Based on the available memory space and I/O volumes on the individual elemental servers included in the reply packets from the other elemental servers, the representative server-determines a schedule of interleaving the memory and I/O components. The representative server notifies the other elemental servers of the thus determined an interleave schedule.

The above initialization procedure has two phases. In the first phase, all elemental servers each issues the power-on inquiry packets and sends replies to the inquiry packets. In the second phase, a single elemental server that gained the representative right issues the packets for checking available memory space and I/O volumes, determines an interleave schedule, and notifies other servers of the interleave schedule. An arbitration means for determining the representative right is provided on the router of the invention. Specifically, having ascertained the power-on of all elemental servers, each elemental server issues a packet for gaining a representative right to the router. The arbitration means grants the representative right to the server which sent the first arrived packet for obtaining a representative right.

The above initialization method according to the typical implementation manner is pre-programmed, assuming that operators turn on the power switches on all elemental servers of the multiprocessor system operating with shared memory units. In other words, the above procedure is an automatic initialization procedure following the power-on of the individual elemental servers. This procedure can be modified that, when power is turned on at only some of the elemental servers of the multiprocessor system operating with shared memory units, at least one server on which the power has been turned on requests the remaining elemental servers to turn their power on. Specifically, at least one elemental server, at the instant of turning its power on, issues power-on request packets instead of the power-on inquiry packets to other elemental server. An elemental server that received the power-on request packet turns its power on, then generates and sends a reply packet to the source server that sent the power-on request packet. In this manner, burdens of powering on/off management for individual servers are alleviated significantly.

Because each of the elemental servers has its power supply unit, any number of elemental servers can be set to run in a sectional computer subsystem of the multiprocessor system, and turning power on/off can be performed separately per sectional computer subsystem.

Moreover, by setting a schedule of interleaving the memory units and I/O subsystems across a plurality of elemental servers, the plurality of elemental servers can be operated as a multiprocessor system with shared memory units in a multiplex manner. Because of sharing the memory units and the I/O subsystems, parallel processing can be implemented in a relatively easily.

DETAILED DESCRIPTION OF THE PREFERRED EMBODIMENTS

With reference to the appended drawings, preferred embodiments of the present invention are described below.
<<Embodiment 1>>

Figure 1:
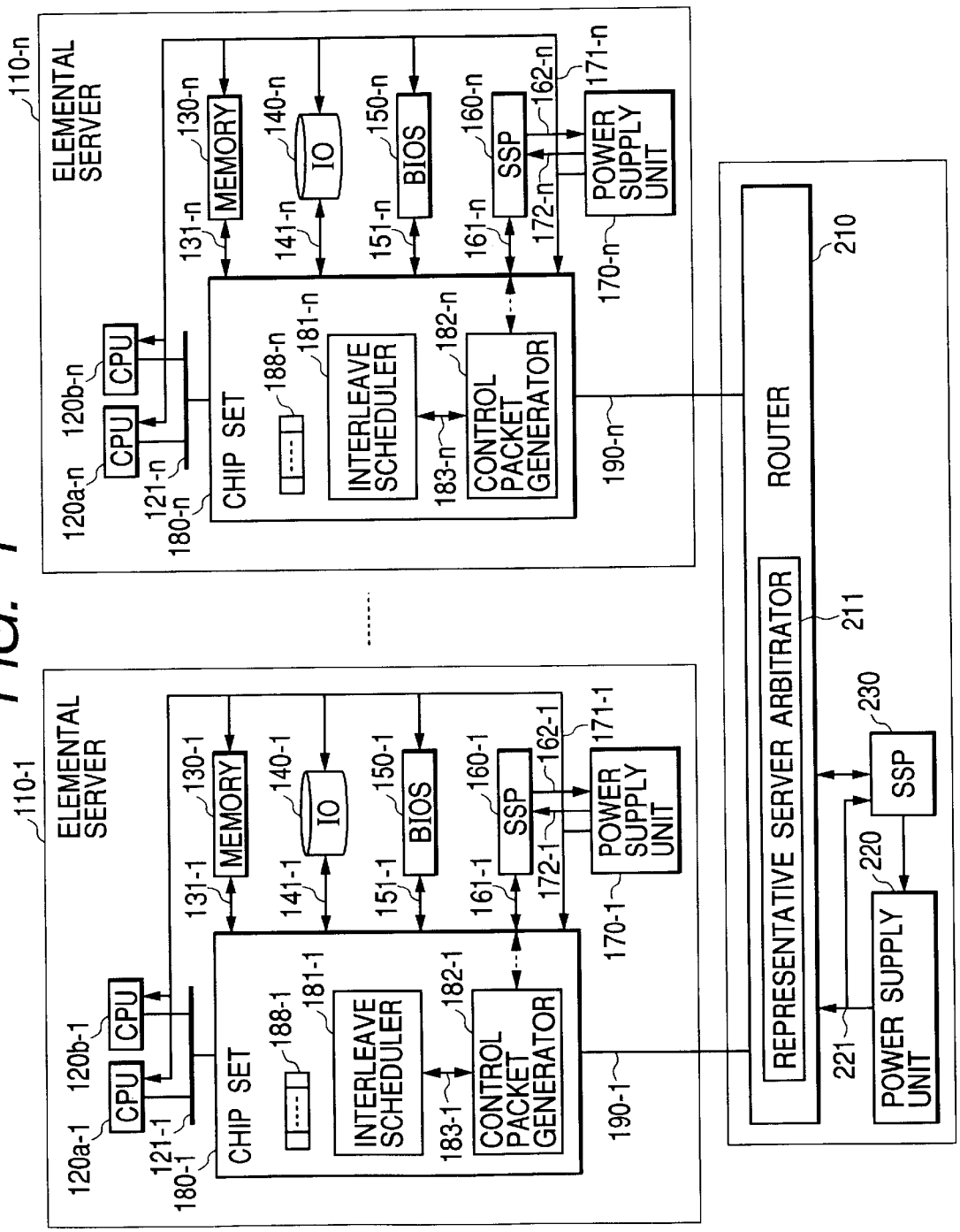
FIG. 1 is a structure diagram of a computer system configured according to an Embodiment 1 of the present invention.
Figure 2:
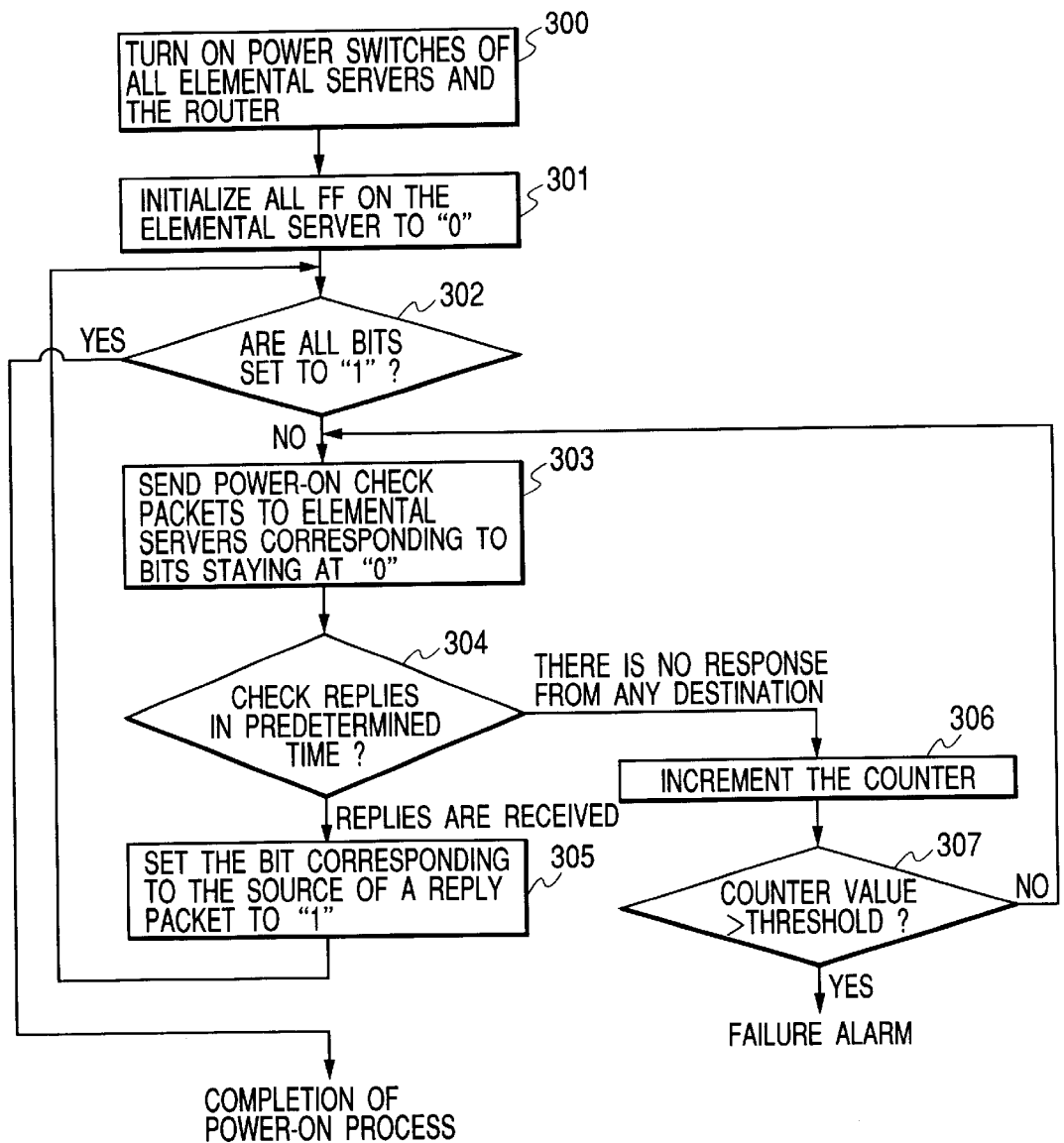
FIG. 2 is a flowchart of the booting procedure of the computer system configured according to the Embodiment 1 of the present invention.

Referring to FIGS. 1 and 2, a preferred Embodiment 1 of the present invention is described.

FIG. 1 outlines the structure of a computer system, configured according to the present invention.

The computer system shown in FIG. 1 comprises n pieces of elemental servers 110-1 to 110-n with their signal lines 190-1 to 190-n connecting to a router 210, wherein the servers are interconnected by a network. To simplify the illustration, the elemental server 110-1 has two CPUs 120a-1 and 120b-1 and other elemental servers have two CPUs as well. The number of CPUs in each elemental server may be one, two, or more. Each elemental server 110-1 includes a memory 130-1, an I/O subsystem 140-1 (that consists of, typically, discs), and a ROM 150-1. The CPUs and these components are connected via a chip set 180-1. The chip set 180-1 controls a CPU bus 121-1 connected to the plurality of CPUs which receives a request for access to the memory and the I/O subsystem, transferred over the CPU bus. According to the type of access, the chip set 180-1 reads or writes data from/to the memory 130-1 and the I/O subsystem 140-1 via a memory interface 131-1 and an I/O interface 141-1. The elemental server 110-1 further includes a power supply unit 170-1 and a system service processor (SSP) 160-1 which takes system control such as changing the operation mode of the elemental server. The ROM 150-1 is used for initializing each elemental server and booting the OS for each CPU.

The power supply unit 170-1 in the elemental server 110-1 supplies power to the CPUs, the memory, the chip set, and the I/O included in the elemental server across a power feed path 171-1. However, the power to the SSP is separately supplied across a power feed path 172-1 (different from the above power feed path 171-1). When being supplied with power across the power feed path 172-1, the SSP controls the power supply unit to start or stop the power to the path 171-1. Hereinafter, "turning the power switch on for booting and initializing each elemental server" or "turning the power on as requested by another elemental server" means "starting the power supply to the components across the power feed path 171-1". In other words, it is assumed that the SSP that takes system control has been supplied with power beforehand and it operates from the start. This is also true for another SSP that attaches to the router 210 for interconnecting the servers. This SSP is described later.

Other elemental servers have exactly the same structure. In FIG. 1, the components of other elemental servers 110-n are identified by reference numerals suffixed with -n.

A power supply unit 220 and an SSP 230 attach to the router 210. The power supply unit 220 is connected to the router 210 and the SSP 230 by a signal line 221 (for power supply). Within the network, a representative server arbitrator 211 is provided. The representative server arbitrator 211 receives control packets to be described later and executes arbitration whereby it grants one elemental server the representative right for determining a schedule of interleaving the memory and the I/O components across the elemental servers. Specifically, the representative server arbitrator 211 detects the first packet arriving there upon, determines whether it grants the representative right to the elemental server that issued the packet, and registers an identifier of the elemental server. The router 210 connected to the representative server arbitrator generates and issues a reply packet in response to the arrived control packet. The reply packet includes the identifier of the elemental server that is granted the representative right and registered with the representative server arbitrator 211.

Based on the elemental server identifier specified in the above reply packet, each elemental server determines whether it is the one that gained the sole representative right in the computer system.

The chip set of each elemental server includes a control packet generator (182-1 to 182-$n$) and an interleaving scheduler (181-1 to 181-$n$). The control packet generator generates packets for control over the system, based on a request from the SSP, the CPU, or the I/O subsystem within the elemental server. When the CPU or the I/O subsystem is obtaining access to its memory or another server's I/O subsystem, the interleave scheduler determines which elemental server and its memory or I/O subsystem to be accessed. Especially, when the power is turned on or off, based on an order issued by the respective SSP 160-1 to 160-$n$, each of the control packet generators 182-1 to 182-$n$ generates control packets with different functions that is recited below. The control packets are sent to other elemental servers and the router. These control packets are transmitted across the respective signal line 190-1 to 190-$n$ and the network to the router, then they are further transmitted to other elemental servers. Through these transmitted packets, the computer system is initialized or shut down.

(1) Power-on Inquiry Packets and Reply Packets.

A power-on inquiry packet is issued from the SSP through the control packet generator of the chip set at the beginning of power supply to the SSP when the power switch is turned on. Using this packet, the procedure for checking the power-on for all elemental servers of the computer system is illustrated in FIG. 2.

FIG. 2 illustrates the power-on check procedure to be carried out on each elemental server. In the Embodiment 1, it is assumed that operators turn on the power switches on all elemental servers of the computer system and the router when booting the computer system. Step 300 in FIG. 2 corresponds to this initial booting step of turning on the power switches of all elemental servers and the router. In the computer system of the present invention, in carrying out the initialization using other packets to be recited later, it is necessary to ensure that the power of all elemental servers of the computer system and the router has actually been turned on with such a power-on inquiry packet. For this purpose, in the present computer system, the chip set or the SSP of each elemental server is provided with a flip-flop chain (hereinafter "FF") with as many bits as the number of the elemental servers and the router. In FIG. 1, as an example, the chip set of each elemental server is provided with this flip-flop chain (FF) 188-1 to 188-$n$. Each FF bit one-to-one corresponds to the elemental servers and the router.

Upon the turn-on of the power switches in the step 300, a "Power On Reset" signal is delivered from the power supply unit and input to other components of the elemental server across the power feed path 171-1, 172-1, or a signal line running in parallel with the feed path. In step 301, triggered by the input of this signal, all the FF found on the chip set are initialized to a predetermined value, for example, "0."

In the next step 303, the power-on inquiry packets are sent to the elemental servers and the router corresponding to the bits maintaining a value of "0" within the FF (at this stage, to all elemental servers and the router). The power-on inquiry packets include the identifier of each source elemental server.

The SSP of each elemental server or the router that received the power-on inquiry packet generates a reply packet in which the elemental server identifier included in the inquiry packet is specified as its destination. The reply packet also includes the identifier of the source elemental server or the router as its sender. The elemental server that sent the power-on inquiry packets determines whether the reply packets arrive in the destinations in step 304. If a reply packet arrives, the bit of the FF corresponding to the source identifier specified in the reply packet is inverted. In the above example, the bit of the FF corresponding to the identifier of the replying elemental server, as specified in the reply packet, is set to "1" in the source elemental server (step 305 in FIG. 2).

If the power has been turned on at all elemental servers and the router, all bits of the FF are finally set to "1" in step 302 such that the completion of the power-on process is ascertained. If the power switches of the elemental servers are turned on in order, the power of some elemental servers may not yet be turned on at a point of time during the communication with the power-on inquiry packets. On the elemental servers with its power remaining off, no reply packet can be generated. Consequently, the elemental server that issued the power-on inquiry packets to such servers does not receive the reply packets after the elapse of a predetermined time. If there is no response from any destination, the process goes from the step 304 to step 306 at which a counter (not shown in FIG. 1) in the chip set or the SSP is updated. If it is determined that the counter value does not reach the threshold value in step 307, the process returns to the step 303. Then, the power-on inquiry packets are reissued.

As sending the power-on inquiry packets is repeated through the above-described process, if it is found that the count value that indicates the number of times the sending has been tried has reached the threshold value in the step 307, whereas it is not observed that all the FF bits are "1s," a failure occurred at the elemental server or the router (that is the destination of one packet). Then, further processing is aborted and a failure alarm is raised with a buzzer or the like.

The above-described process of power-on check for all elemental servers and the router by sending the power-on inquiry packets and ensuring the replies to the packets is performed by each elemental server 110-1 to 110-$n$.

(2) Packets for Gaining a Representative Right Within the Computer System and Reply Packets.

Having ascertained the power-on of all elemental servers of the computer system and the router with the above power-on inquiry packets, each elemental server then issues a packet for gaining a representative right within the system. The packet for gaining a representative right is issued to the router and this packet includes the identifier of the elemental server that issued it.

Upon the reception of this packet, the router routes the packet to the representative server arbitrator 211. The representative server arbitrator 211 registers the elemental server identifier included in the packet that first arrived there in its register and issues reply packets including the elemental server identifier registered with its register in response to the above packet. The arbitrator registers only the source identifier of the first arrived packet with its register, but does not register other elemental server identifiers in subsequent packets.

The reply packets are received by all elemental servers that have been powered on. Each elemental server compares the elemental server identifier included in the received reply packet with its own identifier. In consequence, the elemental server with the same identifier as the identifier specified in the reply packet is the one that gains the sole representative right in the computer system.

The elemental server that gains the representative right issues a plurality of available memory space and I/O volume inquiry packets (to be described below) to other elemental servers. Any elemental server that failed to gain the representative right takes no action until it receives the available memory space and I/O volume inquiry packet.

(3) Available Memory Space and I/O Volume Inquiry Packets and Reply Packets

As described above, available memory space and I/O volume inquiry packets are issued by the elemental server that gains the representative right to other elemental servers of the computer system.

Upon the reception of the available memory space and I/O volume inquiry packet, the chip set of each other elemental server notifies its SSP of the arrival of this packet over the respective signal line 161-1 to 161-n. The SSP thus notified checks the available memory space and I/O volumes configured on the elemental server under its management. The SSP requests its chip set to issue a reply packet of the check result. The chip set thus requested sets the check result of the available memory space and I/O volumes in the reply packet and returns this packet to the representative elemental server that issued the respective available memory space and I/O volume inquiry packet.

In the representative elemental server, its chip set receives the reply packet in which the available memory space and I/O volumes on each other elemental servers are specified then notifies its SSP of the arrival of this packet. The SSP thus notified waits for the replies to the above inquiry packets from all other elemental servers. When all replies have arrived, the SSP generates interleave setting packets which is described below.

(4) Interleave Setting Packets

The SSP of the elemental server that gained the representative right, after ensuring its receipt of the reply packets specified with the available memory space and I/O volumes from all other elemental servers, determines a schedule of interleaving the memory and the I/O components in the computer system. The thus determined interleave schedule is set in the interleave scheduler on the chip set. The control packet generator generates interleave setting packets to notify other elemental servers of the interleave schedule to be issued to other elemental servers.

On each of the other elemental servers, when its chip set receives the interleave setting packet, the chip set notifies its SSP of the reception of this packet. The SSP thus notified set an interleave schedule, based on the contents of the interleave setting packet, i.e., the SSP sets the interleave schedule in the interleave scheduler (181-1 to 181-n) installed on the chip set.

(5) Shutdown Packets

A shutdown packet is issued at the instant of turning off the power switch of any of the elemental servers of the computer system or the router.

When the power switch of an elemental server is turned off, the elemental server issues shutdown packets to other elemental servers. Upon the reception of one of the shutdown packets, any of the other elemental servers turns its power off, then generates and issues a reply packet in response to the shutdown packet.

The elemental server that issued the shutdown packets, after ensuring the receipt of the reply packets from all other elemental servers, issues a shutdown packet to the router 210. The router 210 turns its power off and generates a reply packet as the other elemental servers do. Upon the reception of the reply packet from the router, the elemental server with its power switch turned off stops its power supply thereby completing the shutdown.

In Embodiment 1, through the communication with different types of control packets recited in sections (1) to (4), the following are carried out: ensuring the booting of the individual elemental servers when their power is turned on, checking the available memory space and I/O volumes on each server, and setting a schedule of interleaving the memory and the I/O components in the system. Thus, the system operates as a multiprocessor system with shared and distributed memory units, wherein interleaving of the memory and I/O components is properly scheduled such that all CPUs found of each elemental server evenly gain access to these components. Furthermore, the management of initialization and shutdown including the procedure of communication through shutdown packets recited in section (5) becomes easy and the management cost is reduced.

<<Embodiment 2>>

An Embodiment 2 is a modification of the Embodiment 1. The power-on check procedure of the Embodiment 1 is modified as described below. The power-on check procedure of Embodiment 2 is illustrated in FIG. 3.

In the Embodiment 1, the initialization procedure starts with the power switches of the elemental servers of the computer system and the router having just been turned on, when power-on check is performed. On the other hand, in Embodiment 2, another manner of power-on is illustrated in which, at some of the elemental servers of the computer system or the router, their power switches are turned on thereby turning the power on for the whole computer system.

Instead of the power-on inquiry packet and the control packet used in Embodiment 1, a power-on request packet is used. The power-on request packets are issued by an elemental server or the router whose power switch has just been turned on to other elemental servers or the router. Upon the reception of the power-on request packet, any other elemental server or the router turns its power on if the power supply unit found on it is off. After turning the power on, the elemental server or the router that received the power-on request packet generates and issues a reply packet specified with its identifier. The reply packet is sent to the elemental server or router (the source of the power-on request packet). Even if the power has been turned on beforehand, the reply packet is generated and issued in the same way.

Figure 3:
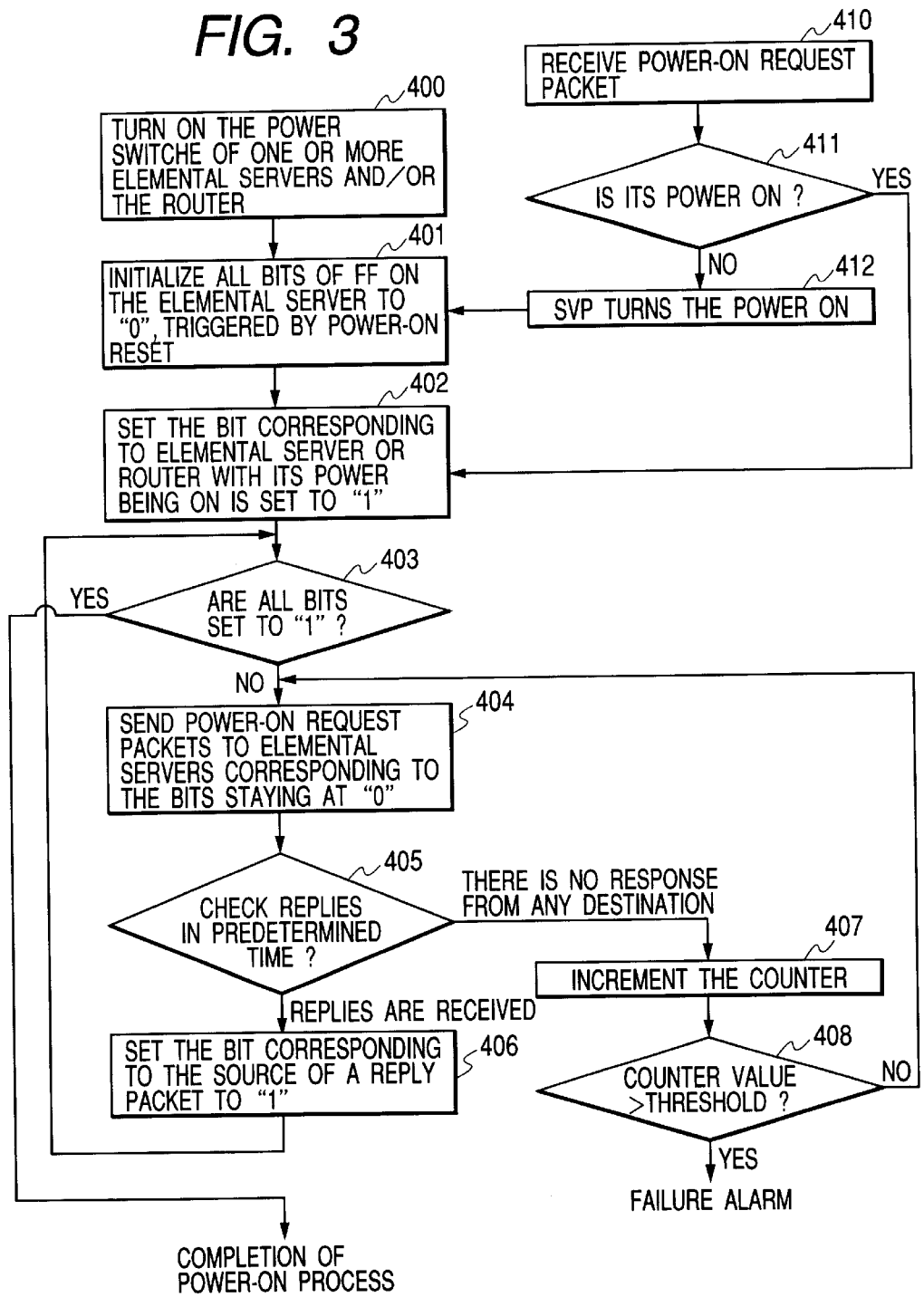
FIG. 3 is a flowchart of the booting procedure of a computer system configured according to an Embodiment 2 of the present invention.

Referring to FIG. 3 in which the process flow of the above packets is illustrated and explained below. The power-on check procedure of the Embodiment 2 to be carried out on each elemental server starts with step 400 in which the power switch of an elemental server is turned on or with the step 410 in which an elemental server receives the power-on request packet from another server. Following the step 410, the server itself checks whether its power is on in step 411. If the power is off, its SSP turns the power on in step 412.

Upon turning the power on in the step 400 or 412, the "Power On Reset" signal is delivered. Triggered by this signal, all bits of the FF on the chip set, each corresponding to one of all elemental servers or the router, are initialized to "0" in the next step 401, as in the Embodiment 1. In step 402, the bit corresponding to an elemental server with its power being on is set to "1." Then, in step 404, the server sends the above-mentioned power-on request packets to the elemental servers and the router corresponding to the bits maintaining the initial value of "0" and awaits the arrival of reply packets. The following process is carried out as in the power-on check flow of the Embodiment 1. That is, upon receiving a reply packet, the server sets the bit of the FF corresponding to the source of the reply packet to "1" (406). To an elemental server corresponding to the bit maintaining the initial value of "0" i.e., the elemental server with its power being off, the server re-transmits the power-on request packet (404). This process is repeated until all the FF bits are set to 1. Therefore, the power on for all elemental servers of the computer system and the router is turned on to ensure the completion of the power-on of each server and the router. The counter increments its counting for each repetition of the packet transmission (407). If the counter value (that indicates the number of times of the packets) has been reissued over a predetermined threshold times, a failure alarm is raised, and further execution of the initialization procedure is aborted (408). These steps are the same as for the Embodiment 1.

According to the Embodiment 2, wherein the elemental servers are configured to execute the above-described procedure, the following is implemented. Only by the operator's action of turning the power switch of some of the elemental servers of a multiprocessor system with shared memories, some elemental servers are turned on. Thereafter, the power of other elemental servers is automatically turned on such that the power-on states of all elemental servers are ascertained. Other details in carrying out the remaining operation of the Embodiment 2 are the same as the Embodiment 1. The elemental server that ascertained the power-on complete states of all elemental servers issues a packet for gaining a representative right. The arbitrator determines only one elemental server that is to grant the representative right. The elemental server that gains the representative right determines a schedule of interleaving the memory and the I/O components in the system. The interleave schedule is set for all elemental servers. Thereby, a multiprocessor system operating with shared memory units is built.

<<Embodiment 3>>

An Embodiment 3 is another modification of the Embodiment 1. In the Embodiment 3, the power-on check procedure is carried out as described below.

Figure 4:
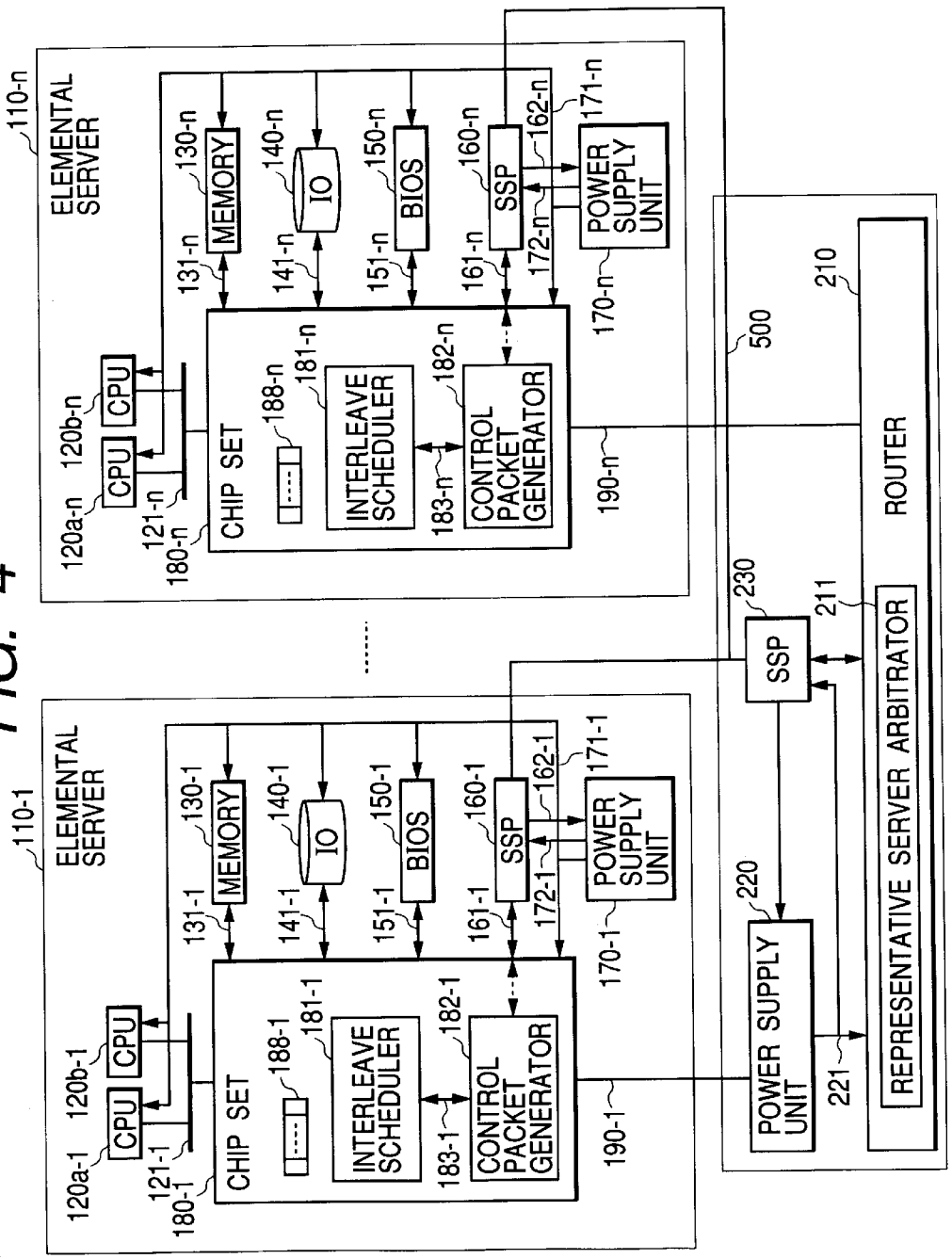
FIG. 4 is a structure diagram of a computer system configured according to an Embodiment 3 of the present invention.

FIG. 4 outlines a computer system configured according to the Embodiment 3. In FIG. 4, the same reference numbers are assigned to the same components as shown in FIG. 1. This configuration differs from the system configuration shown in FIG. 1 in that the SSPs of the elemental servers and the router are connected by a signal line 500.

The signal line 500 is designed to replace the power-on inquiry packets recited in section (1) of the Embodiment 1. An elemental server, on which its power switch has just been turned on, sets the drive level of its drive circuit connected to the signal line 500 to a predetermined logical level. The signal line 500 reaches its logical level only when the drive levels of all drive circuits connected to the signal line are set to the predetermined logical level, which is realized by an inverter and an OR operation.

In this configuration, each elemental server monitors the electrical level of the signal line 500 so as to ensure that the power switches of all elemental servers of the computer system and the router have been turned on.

Figure 6:
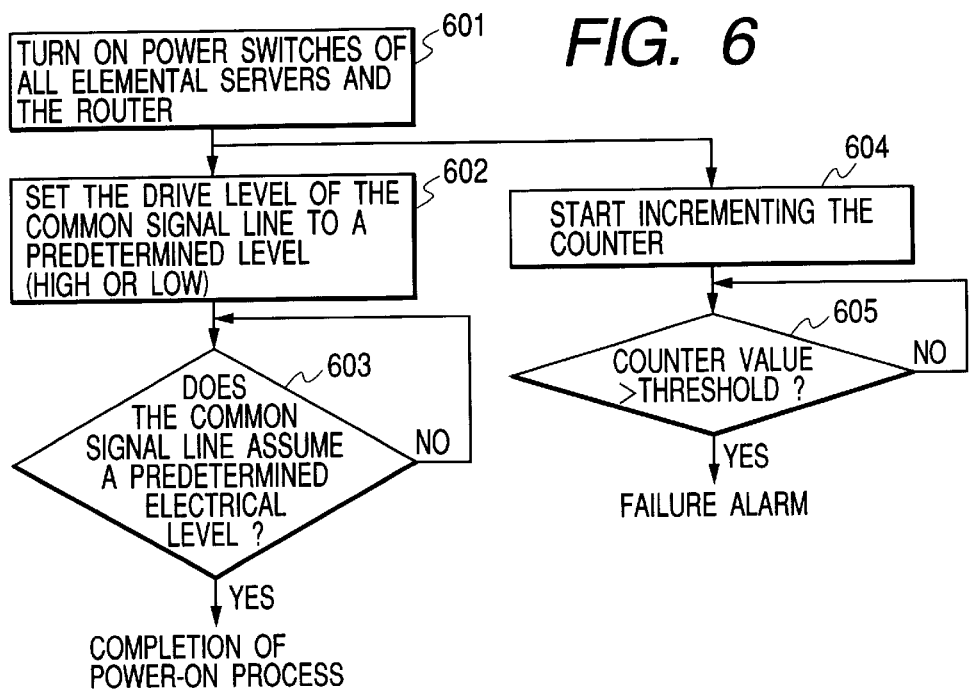
FIG. 6 is a flowchart of the booting procedure of the computer system configured according to the Embodiment 3 of the present invention.
Figure 7:
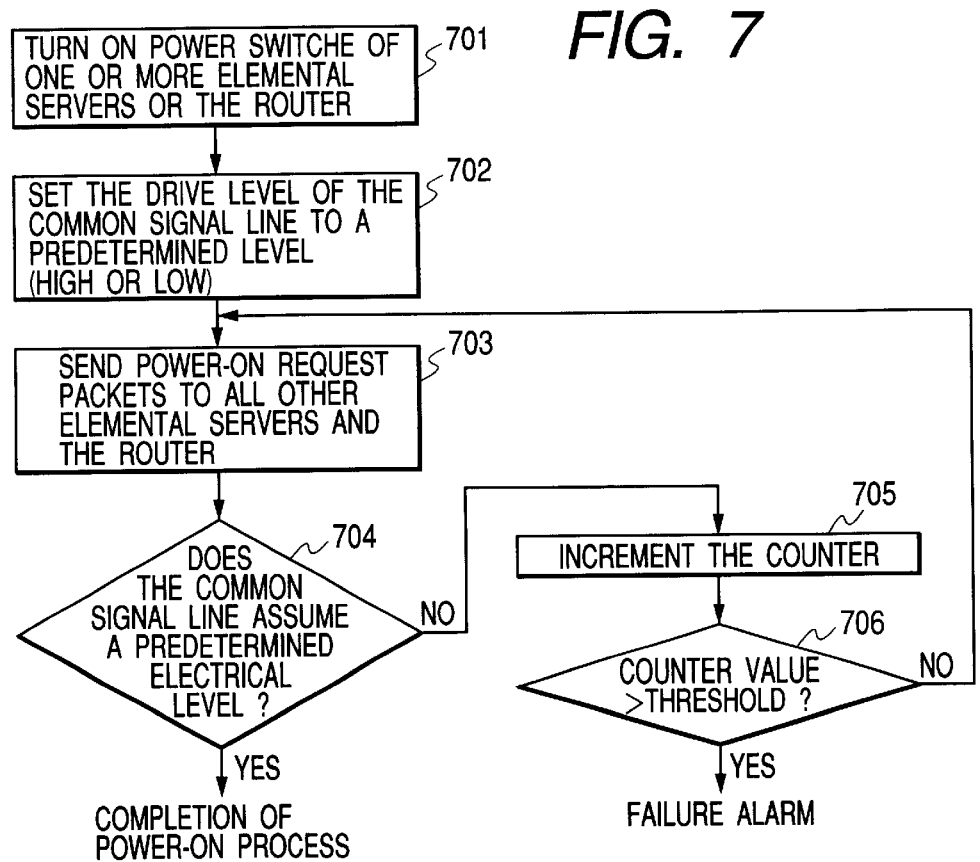
FIG. 7 is a flowchart of another example of the booting procedure of the computer system configured according to the Embodiment 3 of the present invention.

Two power switch turn-on processes are illustrated in FIGS. 6 and 7 respectively. FIG. 6 illustrates the process when the power switches of all elemental servers and the router have been turned on in the initial state. FIG. 7 illustrates the process when the power switches of some of the elemental servers of the computer system or the router have been turned on.

The power-on request packets used in FIG. 7 are the same as those in the Embodiment 2. When an elemental server or the router receives this packet, its SSP turns the power supply to its components on. In the Embodiment 3, however, it is not necessary to issue a reply packet to indicate that the power has now been turned on. The counter used in steps 604 and 707, respectively, in the process flow flows shown in FIGS. 6 and 7 is provided on the chip set or the SSP (which is absent from FIG. 4).

The procedure following the power-on process is the same as described in the Embodiment 1. After determining an elemental server that gains the representative right, an interleave schedule determined by the representative server is set on all elemental servers such that a multiprocessor system operating with shared memory units is built.

<<Embodiment 4>>

A preferred Embodiment 4 is yet another modification of the Embodiment 1. Embodiment 4 differs from Embodiment 1 in operating the packet for gaining a representative right recited in section (2) of the Embodiment 1. The foregoing modification examples (Embodiments 2 and 3) to Embodiment 1 are also applicable to Embodiment 4.

Figure 5:
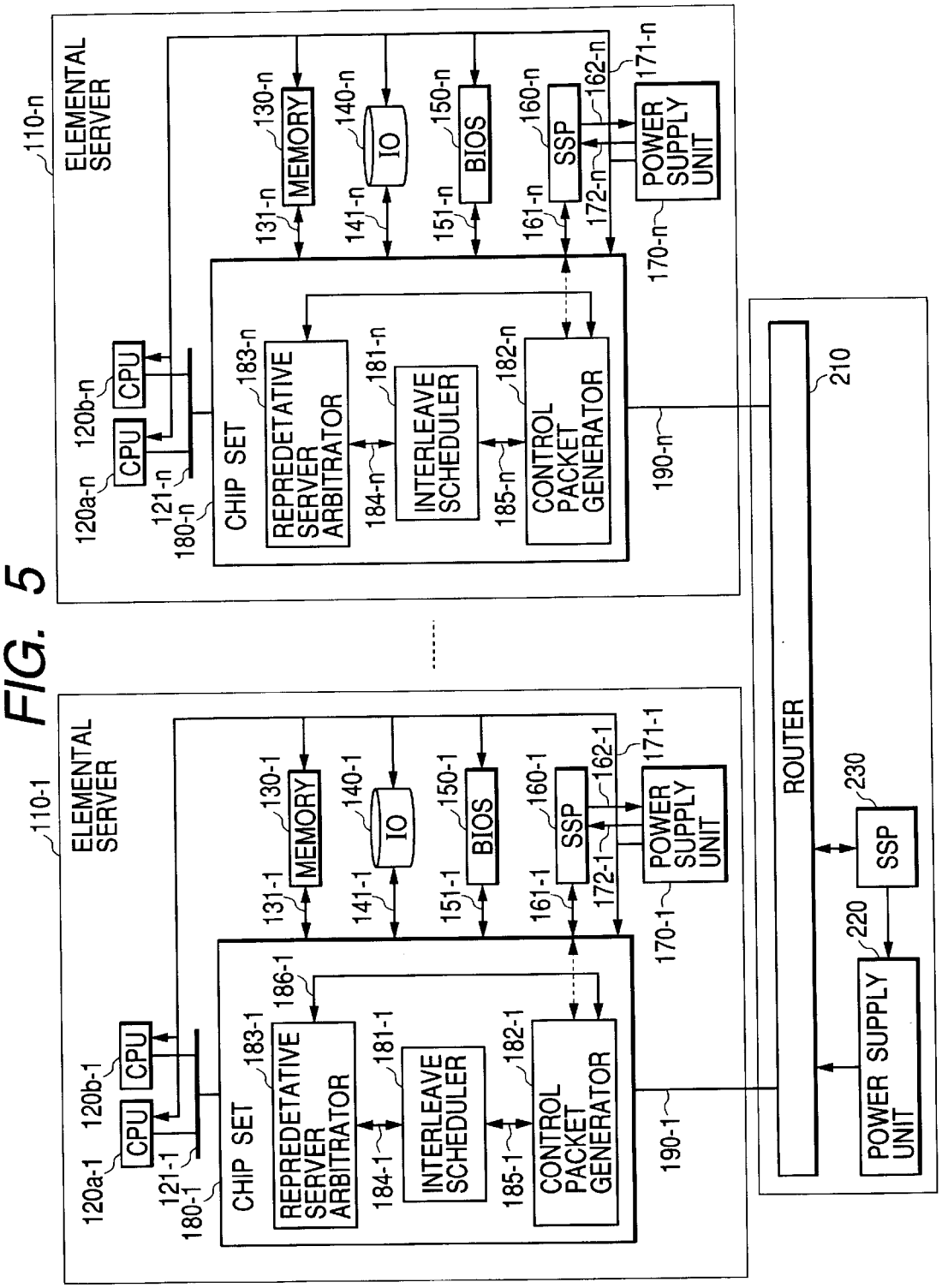
FIG. 5 is a structure diagram of a computer system configured according to an Embodiment 4 of the present invention.

FIG. 5 outlines a computer system configured according to the Embodiment 4. In FIG. 5, the same reference numbers are assigned to the same components as shown in FIG. 1. This configuration differs from the foregoing system configuration in the representative server arbitrators 183-1 to 183-*n* which exist in each elemental server.

In the Embodiment 1, each elemental server issues the packet for gaining a representative right to the router. On the other hand, in the Embodiment 4, each elemental server broadcasts the packets for gaining a representative right to all elemental servers including itself (via the router)

The packets for gaining a representative right broadcasted from all elemental servers arrive at the router in sequence and then arrive at each elemental server in the same sequence. The router has the arbitration function for the packets to be broadcasted. Even if the packets for gaining a representative right from different elemental servers arrive at the router at the same time, the router places them in sequence. Because the packets for gaining a representative right arrive at each elemental server according to the sequence in which the router broadcasts them, all elemental servers observe the same sequence of arrival of the packets for gaining a representative right from all elemental servers.

Then, the representative server arbitrator 183-1 to 183-*n* existing in each elemental server registers the elemental server number specified in the first arrived packet for gaining a representative right as in the Embodiment 1. However, it is different from the Embodiment 1 in that a reply packet in response to the packet for gaining a representative right is not generated in the Embodiment 4. This is because the elemental server identifier registered with the register on the representative server arbitrator existing on each elemental server identifying which elemental server gained the representative right is included in the broadcast received by all elemental servers.

The elemental server having the same identifier as the identifier registered with the above register acts as the representative server in the computer system to carry out the initialization procedure including setting an interleave schedule in the same way as described in the Embodiment 1. Thereby, a multiprocessor system operating with shared memory units is built.

<<Embodiment 5>>

A preferred Embodiment 5 is a modification of the Embodiment 2. The booting procedure described in the Embodiment 2 is modified not to boot all elemental servers. In the Embodiment 5, based on the information of sectional computer subsystems stored in the ROM, only elemental servers belonging to a sectional computer subsystem of interest is booted.

The configuration of the computer system of Embodiment 5 is the same as shown in FIG. 1.

Sectional computer subsystems used herein are computer subsystems, each operating under only one operation system ("OS"). The multiprocessor computer system is divided into a plurality of sections, each consisting of one or more elemental servers. The number of elemental servers in a section is set arbitrarily such that the sum of the elemental servers per section for all sections of the computer system will not exceed the number of elemental servers of the multiprocessor computer system.

The information for sectional computer subsystems stored into the ROM may be provided, for example, in a list table in which the identifiers of elemental servers are indexed with section numbers. Each of the ROMs 150-1 to 150-$n$ shown in FIG. 1 includes such organization information per section in which the elemental server identifiers are listed under section numbers.

An elemental server on which its power has just been turned on can know the section number under which its identifier is specified from the list table stored in the ROM. If, for example, the elemental server 110-1 shown in FIG. 1 is the first one on which its power switch has been turned on, the process flow for power-on check for all elemental servers in the sectional computer subsystem to be carried out on the elemental server 110-1 is described as follows. The elemental server 110-1 finds out the identifiers of the elemental servers assigned with the same section number as its own section number from the list table stored in the ROM 150-1, then executes the step 401 in FIG. 3. Among the bits of the FF 188-1, the bits corresponding to the router 210 and the identifiers of the elemental servers are initialized to "0." Then, in the step 404, the server issues the power-on request packets to the router 210 and only the elemental servers of the same section number. The following process for power-on and power-on check is carried out according to the process flow illustrated in FIG. 3. That is, the retransmission of the power-on request packets is repeated until the reply packets have been received from all other elemental servers corresponding to the bits initialized to "0" (then, the bits become "1s"). In this way, the power-on and the power-on check for the elemental servers in the sectional computer subsystem are performed.

At the stage for determining the representative right, the representative right within the sectional computer subsystem is determined which differs from the Embodiment 2. Having ascertained the power-on for all elemental servers in the section, each powered-on elemental server issues a packet for gaining a representative right, including its section number, to the router. The representative server arbitrator arbitrates among the packets for gaining a representative that include the same section number so as to grant the representative right to one elemental server per each sectional computer subsystem. The elemental server thus granted the representative right determines a schedule of interleaving memory and I/O components within the section and, of course, notifies the other elemental servers of the section of the interleave schedule.

If the computer system is divided into a plurality of sectional computer subsystems, and one elemental server within one section with its power switch being turned off, the shutdown process of the subsystem is executed only within the section. Specifically, the elemental server issues the shutdown packets to other elemental servers of the section. Upon ascertaining that the other elemental servers in the section have shut down their respective power supply, the representing server shuts down its power supply.

<<Embodiment 6>>

The initialization procedure of the Embodiment 1 (wherein the power-on request packet is not used) is applicable to the initialization procedure within a sectional computer subsystem. In the step 301 in FIG. 2, only the bits of the FF corresponding to the elemental servers belonging to the same section and the router are reset to the initial value. Other steps of the procedure are carried out in the same way as described in the Embodiment 1.

To supplement the explanation, while the elemental servers of the multiprocessor system operating with shared memory units are all elemental servers in the computer system, as described in the Embodiments 1 to 4, the same setup is applicable to this embodiment as within a sectional computer subsystem. By substituting "all elemental processors (servers)" with "all elemental processors (servers) within a sectional computer subsystem" in the descriptions of these Embodiments, the reader could appreciate that the initialization and shutdown processes to be carried out within this sectional computer system.

In summary initialization is performed by sequentially executing the following: checking the power-on of the elemental processors (servers) of a multiprocessor system operating with shared memory units, determining a representative server. The representative server determines an interleave schedule and sends notification to other servers. Shutdown is also performed concurrently for the elemental processors (servers) of a multiprocessor system operating with shared memory units.

According to the present invention, in a computer system wherein each of a plurality of elemental servers functioning individually, are interconnected by a network. The computer system is provided with the means for initializing the whole computer system by turning the power on at some or all of the elemental servers of the computer system and the router. Thereby, the whole computer system can be used as a multiprocessor system operating with shared memory units in a multiplex manner.

Because each elemental server includes the power supply unit, even if the computer system is divided into any number of sections, individual power supply units exist per sectional computer subsystem which enables power on/off management in each section. In the present computer system, there are a plurality of elemental servers, each having its own power supply unit. Because these servers are operated under the power on/off management based on the organization information per section stored into its ROM, middleware for power on/off management is not required.

The present invention provides a multiprocessor system operating with shared memory units, wherein the system is configured such that the memory and the I/O units installed on a plurality of elemental servers are accessible and evenly shared by the CPUs of the elemental servers of the same section such that parallel processing can be implemented easily.

The present invention may be embodied in other specific forms without departing from the spirit or essential characteristics thereof. The described embodiments are to be considered in all respects only as illustrative rather than restrictive. The scope of the invention is, therefore, indicated by the appended claims rather than by the foregoing description. All changes which come within the meaning and range of equivalency of the claims are to be embraced within the scope of the claims.

What is claimed is:

1. A method for initializing a computer system comprising a plurality of elemental servers, a router, and a network for interconnecting the elemental servers and the router, each of said elemental servers comprising one or more CPUs, a memory, a BIOS, an I/O subsystem, a chip set for connecting the CPUs, the memory, the BIOS and the I/O subsystem, a power supply unit for supplying power, and a system service processor that is supplied with power by a line separate from a line through which said power supply unit supplies power to the CPUs, the memory, the BIOS and the I/O subsystem and takes system control within the respective elemental server, said method comprising:

- a step of powering on all the elemental servers to constitute at least one multiprocessor system operating with shared memory units;
- a step in which each elemental server, when being powered on, detects power-on status of other servers of said multiprocessor system;
- a step in which, having ascertained that all elemental servers of said multiprocessor system are powered on, each elemental server issues to the router a packet for gaining a representative right;
- a step of selecting an elemental server that is granted the representative right by arbitrating among said packets for gaining a representative right;
- a step in which a selected server that gains the representative right determines a schedule of interleaving the memory and I/O components of the multiprocessor system operating with shared memory units; and
- a step in which the selected server notifies other elemental servers of the thus determined interleave schedule.

2. A method for initializing a computer system as recited in claim 1, wherein, in order to detect the power-on of other elemental servers, each elemental server issues power-on inquiry packets to the other elemental servers; an inquired elemental server that receives a power-on inquiry packet returns a reply packet to a source elemental server that issues the power-on inquiry packet if the power is on at the inquired elemental server; and the source elemental server detects said reply packets from the other elemental servers.

3. A method for initializing a computer system as recited in claim 2, wherein each elemental server issues said power-on inquiry packets, following a preparation step in which each of a plurality of flip-flops that correspond to each of the elemental servers of said multiprocessor system are reset to an initial value upon the power-on of a corresponding elemental server; when the source elemental server detects one of said reply packets, one of bits of the flop-flips corresponding to an inquired server which returns said one of the reply packets is inverted; and the source elemental server reissues power-on inquiry packets to elemental servers corresponding to non-inverted bits of the flip-flops.

4. A method for initializing a computer system as recited in claim 3, wherein each elemental server executes said preparation step to identify elemental servers of the same section operating under one operation system, based on organization information per section stored in the BIOS of each elemental server, resets only bits of the flip-flops corresponding to the elemental servers of the same section to the initial value in order to issue said power-on inquiry packets only to the elemental servers of the same section so as to detect the power-on status of the elemental servers of the same section.

5. A method for initializing a computer system as recited in claim 2, wherein when a number of times of reissuing said power-on inquiry packets to a non-reply elemental server reaches a predetermined number, a failure alarm is raised to abort any further reissuing of said power-on inquiry packets to the non-reply elemental server.

6. A method for initializing a computer system as recited in claim 2, wherein, each elemental server ascertains that the power has been turned on at all elemental servers of said multiprocessor system by monitoring an electrical level of a common signal line connected to said elemental servers, wherein, when all drive levels of the elemental servers reach a predetermined level, a level of the common signal line switches.

7. A method for initializing a computer system comprising a plurality of elemental servers, a router, and a network for interconnecting the elemental servers and the router, each of said elemental servers comprising one or more CPUs, a memory, a BIOS, an I/O subsystem, a chip set for connecting the CPUs, the memory, the BIOS and the I/O subsystem, a power supply unit for supplying power, and a system service processor that is supplied with power by a line separate from a line through which said power supply unit supplies power to the CPUs, the memory, the BIOS and the I/O subsystem and takes system control within the elemental server, said method comprising:

- a step of powering on at least one of the elemental servers of a multiprocessor system operating with shared memory units;
- a step in which said at least one elemental server being powered on causes other elemental servers of said multiprocessor system to be powered on;
- a step in which, having ascertained that all elemental servers of said multiprocessor system are powered on, said at least one elemental server issues a packet to the router for gaining a representative right;
- a step of selecting an elemental server that is granted the representative right by arbitrating among said packets for gaining a representative right;
- a step in which a selected elemental server that gains the representative right determines a schedule of interleaving the memory and I/O components of the multiprocessor system operating with shared memory units; and
- a step in which the selected elemental server notifies other elemental servers of the thus determined interleave schedule.

8. A method for initializing a computer system as recited in claim 7, wherein, said at least one elemental server powers on other elemental servers of the multiprocessor system by issuing power-on request packets to the other elemental servers; each of the other elemental servers that receives one of the power-on request packets powers on and returns a reply packet to the requesting elemental server that issues the power-on request packet; and the requesting elemental server ascertains that the power has been turned on at other elemental servers by detecting said reply packets from the other elemental servers.

9. A method for initializing a computer system as recited in claim 8, wherein said at least one elemental server issues said power-on inquiry packets, following a preparation step in which each of a plurality of bits of flip-flops that correspond to each of the elemental servers of said multiprocessor system are reset to an initial value upon the power-on of a corresponding elemental server; when the requesting elemental server detects one of said reply packets, one of the bits of the flop-flips corresponding to a requested elemental server which returns said one of said reply packets is inverted; and the requesting elemental server reissues the power-on inquiry packets to elemental servers corresponding to non-inverted bits of the flip-flops.

10. A method for initializing a computer system as recited in claim 9, wherein said at least one elemental server executes said preparation step to identify elemental servers of the same section operating under one operation system, based on organization information per section stored in the BIOS of each elemental server, resets only bits of the flip-flops corresponding to the elemental servers of the same section to the initial value in order to issue said power-on request packets only to the elemental servers of the same section so as to request and detect the power-on status of the elemental servers of the same section.

11. A method for initializing a computer system as recited in claim 7, wherein said at least one elemental server requests other elemental servers of the multiprocessor system to turn on their power by issuing power-on request packets to the other elemental servers and ascertains that the power has been turned on at all elemental servers of said multiprocessor system by monitoring an electrical level of a common signal line connected to said elemental servers, wherein, when all drive levels of the elemental servers reach a predetermined level, a level of the common signal line switches.

12. A method for turning power off and shutting down a computer system comprising a plurality of elemental servers, a router, and a network for interconnecting the elemental servers and the router, each of said elemental servers comprising one or more CPUs, a memory, a BIOS, an I/O subsystem, a chip set for connecting the CPUs, the memory, the BIOS, and the I/O subsystem, a power supply unit for supplying power, and a system service processor that is supplied with power by a line separate from a line through which said power supply unit supplies power to the CPUs, the memory, the BIOS, and the I/O subsystem and takes system control within the elemental server, said method comprising:

a step in which any one of said elemental servers or the router issues shutdown request packets to other elemental servers when being powered off;

a step in which a requested elemental server that received said shutdown request packet sends an acknowledgment packet of said shutdown request packet back to the requesting elemental server that sends said shutdown request packet and powers off; and a step in which the requesting elemental server or the router being powered off awaits said acknowledgment packets from all requested elemental servers in order to generate and send a shutdown control packet to the router to power off the router so as to shut down the computer system.

13. A method for turning power off and shutting down a computer system comprising a plurality of elemental servers, a router, and a network for interconnecting the elemental servers and the router, each of said elemental servers comprising one or more CPUs, a memory, a BIOS, an I/O subsystem, a chip set for connecting the CPUs, the memory, the BIOS, and the I/O subsystem, a power supply unit for supplying power, and a system service processor that is supplied with power by a line separate from a line through which said power supply unit supplies power to the CPUs, the memory, the BIOS, and the I/O subsystem and takes system control within the elemental server, wherein said computer system is divided into sections, each of which consisting of some of said plurality of elemental servers, said method comprising:

a step in which one of said elemental servers, when being powered off, sends shutdown request packets only to elemental servers of the same section, based on organization information per section stored in the BIOS of each of said elemental servers; and a step in which the elemental servers that receive said shutdown request packets power off.

14. A method for initializing a computer system as recited in claim 1, wherein the arbitrating in the selecting step is conducted by granting the representative right to a source elemental server issuing a first arrived packet for gaining a representative right at the router.

15. A method for initializing a computer system as recited in claim 1, wherein the step of powering on all the elemental servers, some of the elemental servers and router are turned on by an user, said some of the elemental servers then turn on the other elemental servers.

16. A method for initializing a computer system as recited in claim 1, wherein the step of issuing to the router a packet for gaining a representative right, respective packets for gaining the representative right are also issued to all the elemental servers.

17. A method for initializing a computer system as recited in claim 16, wherein the packets for gaining a representative right arrive at the router and the elemental servers in the same sequence such that the selection step is conducted in the router and in the elemental servers by granting the representative right to a source elemental server issuing a first packet for gaining a representative right in the sequence.

18. A method for initializing a computer system as recited in claim 4, wherein the arbitrating in the selecting step is conducted by granting the representative right to each source elemental server of the same section issuing a first arrived packet for gaining a representative right at the router.

19. A method for initializing a computer system as recited in claim 7, wherein the arbitrating in the selecting step is conducted by granting the representative right to each source elemental server of the same section issuing a first arrived packet for gaining a representative right at the router.

\* \* \* \* \*